(12) United States Patent
Stang et al.

(10) Patent No.: US 8,531,790 B2
(45) Date of Patent: Sep. 10, 2013

(54) LINEAR ACTUATOR ASSEMBLIES AND METHODS OF MAKING THE SAME

(75) Inventors: Jean-Pierre Stang, Labege (FR);
Virginie Benos, Drémil Lafage (FR);
Bernard Serres, Drémil Lafage (FR);
Khalid El Akel, Castanet (FR)

(73) Assignee: Intermec IP Corp., Everett, WA (US)

( * ) Notice: Subject to any disclaimer, the term of this patent is extended or adjusted under 35 U.S.C. 154(b) by 296 days.

(21) Appl. No.: 13/033,124

(22) Filed: Feb. 23, 2011

(65) Prior Publication Data

US 2012/0212844 A1    Aug. 23, 2012

(51) Int. Cl.
*G02B 7/02*    (2006.01)

(52) U.S. Cl.
USPC ........................................................ 359/824

(58) Field of Classification Search
USPC .................................................. 359/824, 694
See application file for complete search history.

(56) References Cited

U.S. PATENT DOCUMENTS

| 5,587,846 A | * | 12/1996 | Miyano et al. | ................ 359/824 |
| 2010/0046100 A1 | * | 2/2010 | Yoshida | ........................ 359/824 |

* cited by examiner

*Primary Examiner* — James Jones
(74) *Attorney, Agent, or Firm* — Seed IP Law Group PLLC

(57) ABSTRACT

A linear actuator assembly is provided, the assembly including a linear actuator, an elongated guide spaced in parallel alignment with the linear actuator and a movable carriage disposed therebetween. The carriage includes a first notch to receive a rod of the linear actuator and a second notch to receive the guide. The carriage remains in direct and continuous contact with the linear actuator and the guide at the first notch and second notch, respectively, when the carriage moves linearly back and forth along a travel axis.

24 Claims, 4 Drawing Sheets

LINEAR ACTUATOR ASSEMBLIES AND METHODS OF MAKING THE SAME

BACKGROUND

1. Technical Field

This disclosure generally relates to positioning devices, and more particularly to positioning devices including linear actuators for high precision positioning of movable components, such as, for example, positioning of a lens within an imaging apparatus.

2. Description of the Related Art

Modern imaging apparatuses (e.g., machine-readable symbol readers, video cameras, digital cameras, camera cell phones, smart phones and personal digital assistants) typically include one or more lenses that may be moved in order to zoom, focus, change depth of field, and capture a desired image by focusing the image on an image pickup device (e.g., charged-coupled devices, CMOS imager). To move the lens or lenses, it is known to use various motors, such as, for example, a stepper motor, a DC motor or piezoelectric motor. Systems for coupling such motors to a lens or other movable components may, however, suffer from a variety of drawbacks. For example, some motors and motor assemblies are relatively bulky and may not have the necessary positional repeatability to meet accuracy standards demanded of today's imaging apparatuses. Further, the systems for coupling the motors to movable components can include gaps arising, for example, from standard fabrication tolerances. These gaps can lead to positional inaccuracies, which in the case of imaging devices can limit the capabilities of the devices and negatively affect image quality.

Consequently, improved positioning devices and methods of making the same are desirable. The positioning devices should be highly accurate and have a relatively small form factor or package.

BRIEF SUMMARY

The linear actuator assemblies and methods described herein provide for the efficient and accurate positioning of movable components. In various embodiments, the linear actuator assemblies are particularly well adapted for positioning a movable carriage in a highly accurate manner by maintaining direct and continuous contact between the carriage and each of a pair of linear actuators, or alternatively, a linear actuator and a static guide rod.

A linear actuator assembly may be summarized as including a first linear actuator, the first linear actuator including a rod extending from a base, the base including a piezoelectric component to selectively oscillate the rod; an elongated cylindrical guide spaced in parallel alignment with the rod of the first linear actuator; and a movable carriage, the carriage including a first notch to receive the rod of the first linear actuator and a second notch to receive the guide, and the carriage in direct and continuous contact with the first linear actuator and the guide at the first notch and the second notch, respectively, when the carriage moves linearly back and forth along a travel axis.

The linear actuator assembly may further include a first spring coupled to the carriage to urge the first linear actuator into contact with the first notch of the carriage and a second spring coupled to the carriage to urge the guide into contact with the second notch of the carriage. The first spring and the second spring may be flat cantilever springs coupled to the carriage remote from the first notch and the second notch, respectively. The first spring may urge the first linear actuator into contact with the first notch with more force than the second spring urges the guide into contact with the second notch. The first spring and the second spring may be identical and a diameter of the guide may be smaller than a diameter of the rod of the first linear actuator. The first spring may have a greater spring constant than a spring constant of the second spring and a diameter of the guide may be equal to a diameter of the rod of the first linear actuator. Each of the first notch and the second notch of the movable carriage may be V-shape.

The guide may be a rod extending from a base of a second linear actuator, the base of the second linear actuator including a piezoelectric component to selectively oscillate the rod of the second linear actuator. The second linear actuator may be oriented in a same direction as the first linear actuator to selectively cooperatively move the carriage back and forth along the travel axis. The second linear actuator may be oriented in an opposite direction of the first linear actuator to selectively cooperatively move the carriage back and forth along the travel axis. The first linear actuator and the second linear actuator may be ultrasonic linear actuators. The linear actuator assembly may further include a chassis and a plurality of elastomeric bushings, wherein at least one of the plurality of elastomeric bushings is coupled to the chassis to receive a portion of the first linear actuator, and wherein at least one of the plurality of elastomeric bushings is coupled to the chassis to receive a portion of the second linear actuator. A first pair of elastomeric bushings may be coupled to the chassis to support the first linear actuator at opposing ends thereof and a second pair of elastic elastomeric bushings may be coupled to the chassis to support the second linear actuator at opposing ends thereof. A nominal distance between apertures of the chassis to receive the first pair of elastomeric bushings and apertures of the chassis to receive the second pair of elastomeric bushings may be less than a distance between a centerline of the rod of the first linear actuator and a centerline of the rod of the second linear actuator when received in the first notch and the second notch of the carriage, respectively. The linear actuator assembly may further include a lens coupled to the carriage to move back and forth therewith. The linear actuator assembly may be sized to lie within the confines of a reference cube having edges with a length equal to three-quarters of an inch.

An autofocus imager may be summarized as including a linear actuator assembly, the linear actuator assembly including a movable carriage and a pair of linear actuators to cooperatively move the carriage back and forth along a travel axis, the carriage including a pair of corresponding notches to receive a rod of a respective one of the pair of linear actuators, and each rod of the pair of linear actuators urged into direct and continuous contact with the carriage as the carriage moves back and forth along the travel axis. A lens may be coupled to the carriage to move back and forth therewith to adjust a focus of the autofocus imager.

The pair of linear actuators may be oriented in a same direction or in opposite directions. The pair of linear actuators may be ultrasonic linear actuators. The linear actuator assembly may further include a chassis and a plurality of elastomeric bushings, at least one elastomeric bushing coupled to the chassis to receive a portion of a first one of the pair of linear actuators and at least one elastomeric bushing coupled to the chassis to receive a portion of a second one of the pair of linear actuators. A nominal distance between an aperture in the chassis to receive the elastomeric bushing corresponding to the first one of the pair of linear actuators and an aperture in the chassis to receive the elastomeric bushing corresponding to the second one of the pair of linear actuators may be less than a distance between a centerline of a rod of the first one of the pair of linear actuators and a centerline of a rod of the second one of the pair of linear actuators when the pair of linear actuators are received in the corresponding pair of notches.

A method of making a linear actuator assembly may be summarized as including providing a first linear actuator including a rod extending from a base, the base including a piezoelectric component to selectively oscillate the rod; and disposing a movable carriage between the first linear actuator and an elongated cylindrical guide spaced in parallel alignment with the rod of the first linear actuator, the first linear actuator and the guide positioned in a respective notch of the carriage such that the carriage is supported in direct and continuous contact with the first linear actuator and the guide when the carriage moves back and forth along a travel axis.

The method may further include coupling a first spring to the carriage to bias the first linear actuator into contact with the carriage and coupling a second spring to the carriage to bias the guide into contact with the carriage. Disposing the movable carriage between the first linear actuator and the elongated cylindrical guide may include disposing the movable carriage between the first linear actuator and the elongated cylindrical guide in the form of a rod extending from a base of a second linear actuator, the base of the second linear actuator including a piezoelectric component to selectively oscillate the rod of the second linear actuator. The method may further include coupling the first linear actuator to a chassis with at least one elastomeric bushing and coupling the second linear actuator to the chassis with at least one elastomeric bushing. Coupling the first linear actuator and the second linear actuator to the chassis may include coupling the first linear actuator and the second linear actuator to the chassis such that a nominal distance between an aperture in the chassis to receive an elastomeric bushing corresponding to the first linear actuator and an aperture in the chassis to receive an elastomeric bushing corresponding to the second linear actuator is less than a distance between a centerline of the rod of the first linear actuator and a centerline of the rod of the second linear actuator when the linear actuators are received in the notches of the carriage.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles may not be drawn to scale, and some of these elements may be arbitrarily enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and manufacturing techniques associated with positioning devices, imaging apparatuses, and piezoelectric motors and control systems therefor may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
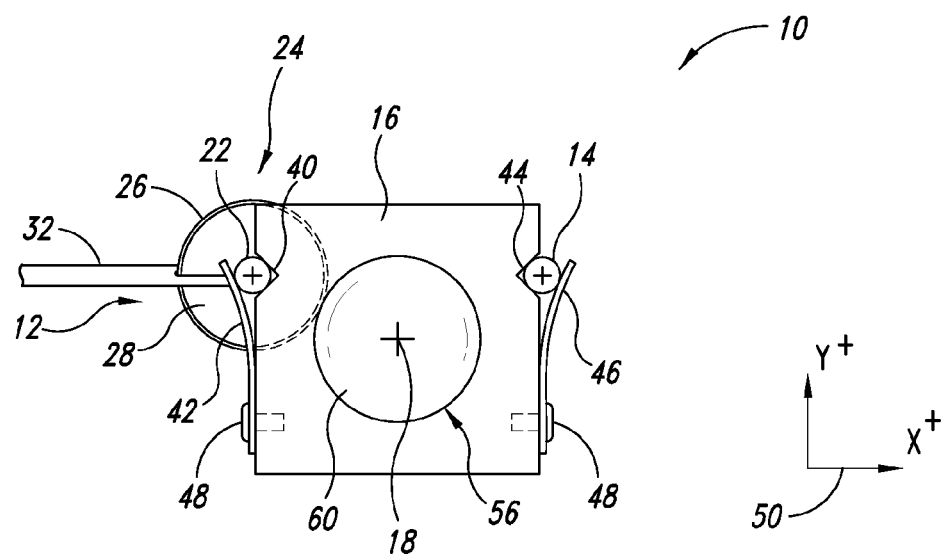
FIG. 1 is a front elevational view of a linear actuator assembly according to one embodiment.
Figure 2:
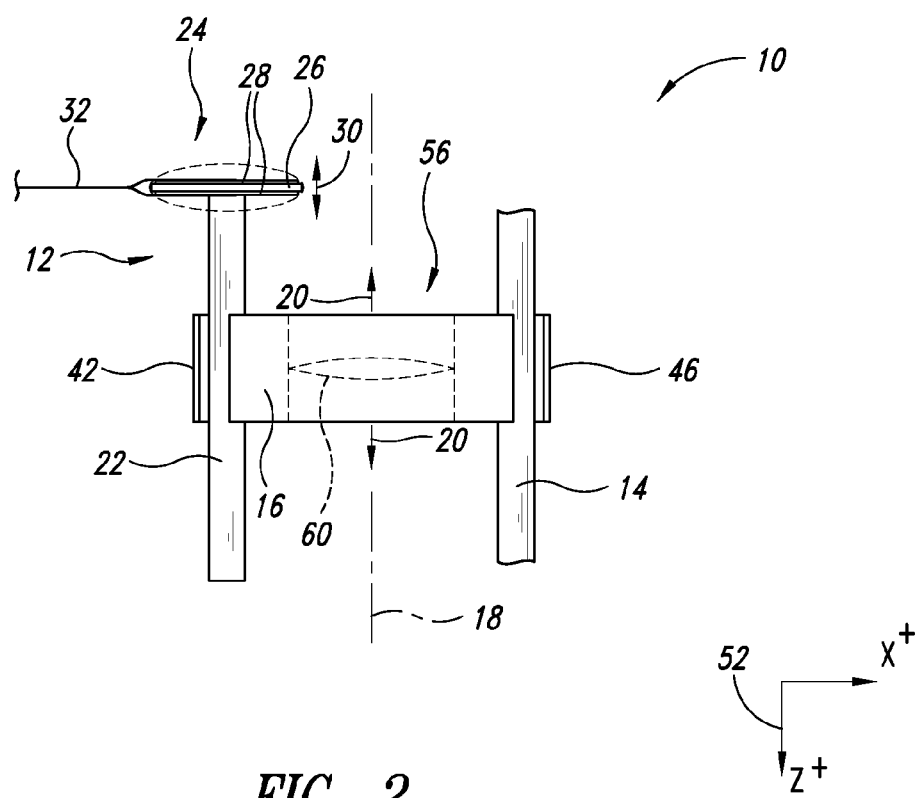
FIG. 2 is a top plan view of the linear actuator assembly of FIG. 1.

FIGS. 1 and 2 show a linear actuator assembly 10 according to one embodiment. The linear actuator assembly 10 includes a linear actuator 12, an elongated guide in the form of a static cylindrical guide rod 14, and a movable carriage 16. The carriage 16 is positioned between the linear actuator 12 and the static guide rod 14 and remains in sliding contact with each as the linear actuator 12 moves the carriage 16 back and forth along a travel axis 18 during operation, as indicated by the arrows labeled 20.

The linear actuator 12 includes an elongated guide in the form of a dynamic cylindrical rod 22 extending from a base 24 thereof. The base 24 includes an actuator in the form of an elastic disc portion 26 and piezoelectric components 28 which deflect in response to an applied electrical current or voltage, as indicated by the arrows labeled 30. An electrical conductor, for example, a flex circuit 32 is electrically coupled to the linear actuator 12 to selectively apply an electric field to the piezoelectric components 28, and thus selectively deflect or oscillate the same. The rate of deflection or oscillation may be controlled such that the rod 22 accelerates and decelerates at different rates. In doing so, the rod 22 and the carriage 16 move together during relatively slow accelerations and decelerations due to friction between the rod 22 and the carriage 16. Conversely, during relatively fast accelerations and decelerations, the rod 22 may slide along a surface of the carriage 16 due to the inertia of the carriage 16 which prevents the carriage 16 from moving with the rod 22. Consequently, the carriage 16 can be incrementally advanced back and forth along the rod 22 by controlling the rate of acceleration and deceleration of the rod 22 caused by deflections or oscillations of the piezoelectric components 28. For example, the rod 22 may initially extend forward relatively slowly moving the carriage 16 with it and then retract relatively quickly leaving the carriage 16 at an advanced position. Repeating this process moves the carriage 16 along the travel axis 18 in one direction. Reversing the process moves the carriage 16 along the travel axis 18 in the opposite direction. In some embodiments, the rod 22 can be driven to oscillate or reciprocate, for example, at ultrasonic frequencies (e.g., above approximately 20 kHz). Accordingly, the linear actuator 12 may be an ultrasonic linear actuator.

The carriage 16 includes a first V-shape notch 40 sized to receive the rod 22 of the linear actuator 12. A spring 42 is secured to the carriage 16 and positioned to urge the rod 22 of the linear actuator 12 into the first V-shape notch 40 such the rod 22 is held in direct and continuous contact with the carriage 16 during operation of the linear actuator assembly 10. The carriage 16 further includes a second V-shape notch 44 sized to receive the static guide rod 14. Another spring 46 is secured to the carriage 16 and positioned to urge the guide rod 14 into the V-shape notch 44 such the guide rod 14 is also held in direct and continuous contact with the carriage 16 during operation of the linear actuator assembly 10. The surfaces of the V-shape notches 40, 44 are shown as planar surfaces, but in some embodiments they may be slightly convex or concave. The V-shape notches 40, 44 may also be truncated or rounded at the apex. Further, as shown in the illustrated embodiment, the notches 40, 44 may be of the same size. In other embodiments, the notches 40, 44 may be different sizes. The notches 40, 44 may also be of different shapes, such as, for example, a U-shape. The notches 40, 44 are shown on opposing surfaces of the carriage 16 in a symmetric configuration; however, the notches 40, 44 may be located on non-opposing surfaces of the carriage 16 and may be positioned asymmetrically.

The springs 42, 46 of the illustrated embodiment of FIGS. 1 and 2 are shown as flat, cantilevered springs (e.g., leaf springs) fastened to the carriage 16 with fasteners 48. It is appreciated, however, that other types of springs and couplers may be used to bias the linear actuator 12 and the guide rod 14 towards the carriage 16. So as to not unduly interfere with the drive mechanism of the linear actuator 12, the spring 42 cooperates with the guide rod 14 to urge the guide rod 14 against the second V-shape notch 44 of the carriage 16 with less force than the force applied by the spring 42 urging the linear actuator 12 against the first V-shape notch 40. This may be accomplished, for example, by using identical springs 42, 46, symmetric notches 40, 44, and a guide rod 14 having a smaller diameter than that of the rod 22 of the linear actuator 12 such that the spring 46 undergoes less deflection when abutting the guide rod 14. Alternatively, the notches 40, 44 may be asymmetrically shaped or positioned such that a guide rod 14 of similar diameter to that of the rod 22 of the linear actuator 12 protrudes from the carriage 16 less than the rod 22 of the linear actuator 12. In still further alternative embodiments, the spring 46 engaging the guide rod 14 may be selected to have a different spring coefficient or may be positioned asymmetrically with respect to the other spring 42 (e.g., offset from the side of the carriage 16) to deflect to a lesser degree when abutting the guide rod 14.

In operation, control circuitry and related components which are not described in detail herein to avoid unnecessarily obscuring descriptions of the embodiments, may be used to control the linear actuator 12 and selectively drive the carriage 16 back and forth along the travel axis 18. Throughout operation, the linear actuator 12 and the guide rod 14 are held in direct and continuous contact with the carriage 16 such that no gaps exist between these components. As such, the carriage 16 is restrained with respect to movement in an x-y reference plane 50, but the carriage 16 is able to translate in the z-direction as defined by a corresponding x-z reference plane 52. This prevents rotation and/or displacement of the carriage 16 with respect to the x-y reference plane, and enables highly accurate repositioning of the carriage 16 along the travel axis 18.

The carriage 16 is illustrated as including a central cavity 56 which can be used, for example, to house components for movement about the travel axis 18 with respect to a host apparatus. For instance, a lens 60 may be secured within the cavity 56 of the carriage 16 for selective movement of the lens 60 along the travel axis 18. Thus, the linear actuator assembly 10 may be incorporated into a camera or other imaging device (e.g., handheld machine-readable symbol reader) to facilitate autofocus capabilities of those devices. Accordingly, in some embodiments, an autofocus imager may be provided comprising the linear actuator assemblies described herein.

Figure 3:
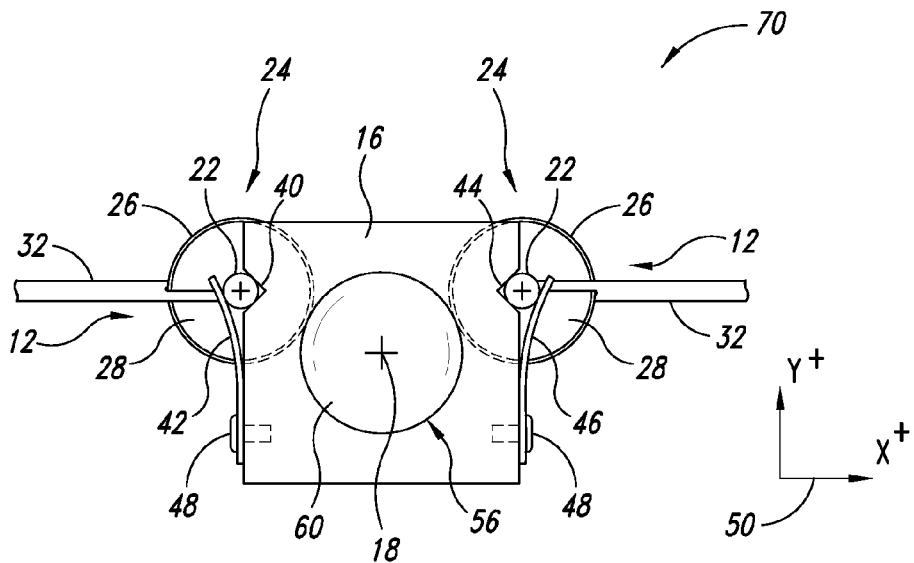
FIG. 3 is a front elevational view of a linear actuator assembly according to another embodiment.
Figure 4:
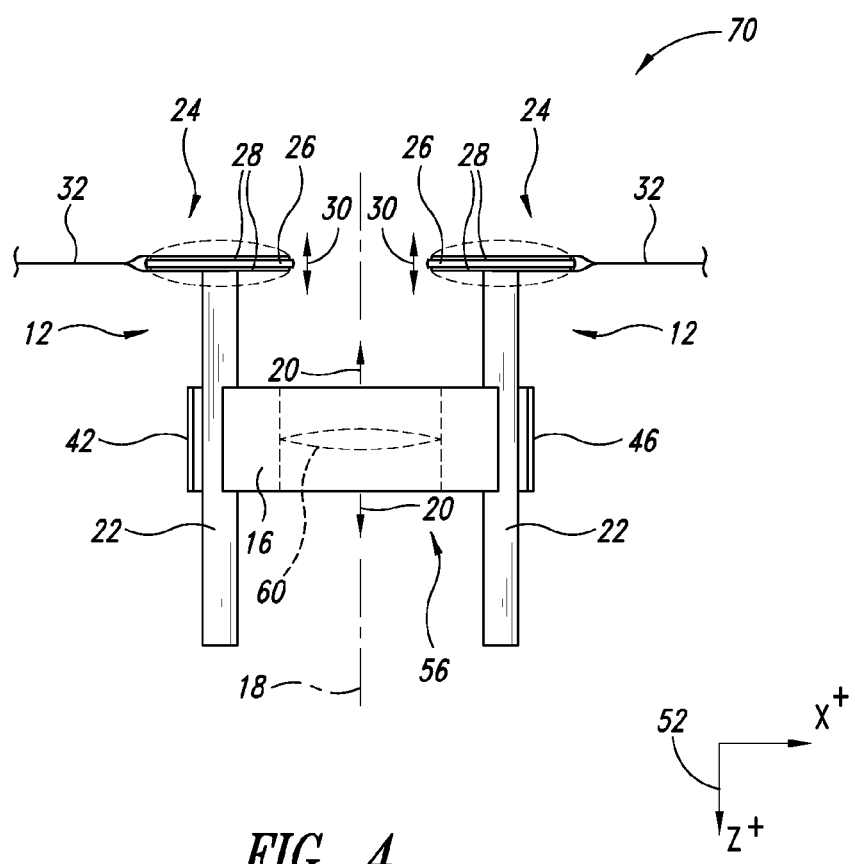
FIG. 4 is a top plan view of the linear actuator assembly of FIG. 3.

FIGS. 3 and 4 show a linear actuator assembly 70 according to another embodiment. In this embodiment, a dynamic elongated cylindrical guide in the form of a second or supplemental linear actuator 12 is coupled to the carriage 16 in lieu of the static guide rod 14 described above. This second linear actuator 12 is in parallel arrangement with the first linear actuator 12 and oriented in the same direction. The second linear actuator 12 may be identical to the first linear actuator 12, as illustrated, or it may be different therefrom. The linear actuators 12 may cooperate in unison to drive the carriage 16 back and forth along the travel axis 18. In this manner, the speed with which the carriage 16 moves may be increased relative to the previously described embodiment. Alternatively, the electrical consumption of the system may be reduced while maintaining comparable operational speeds.

Figure 5:
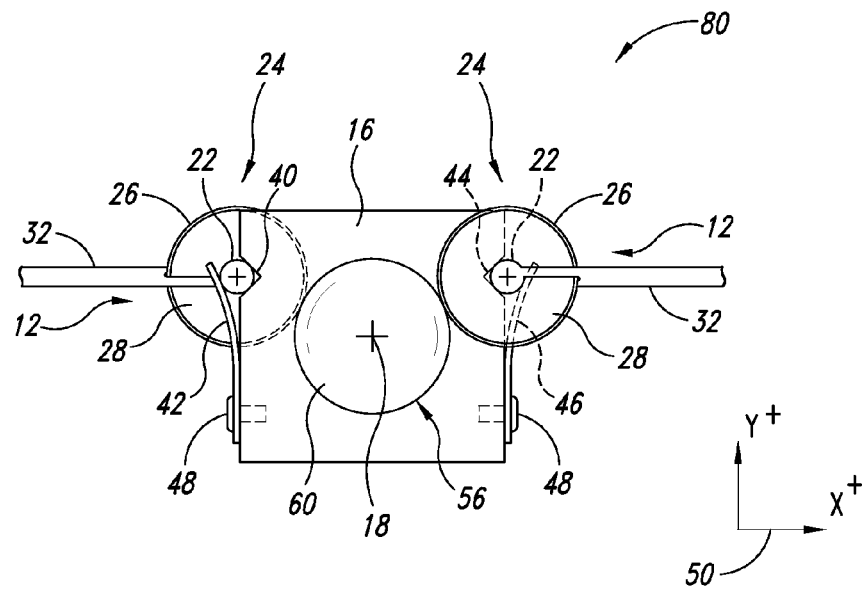
FIG. 5 is a front elevational view of a linear actuator assembly according to another embodiment.
Figure 6:
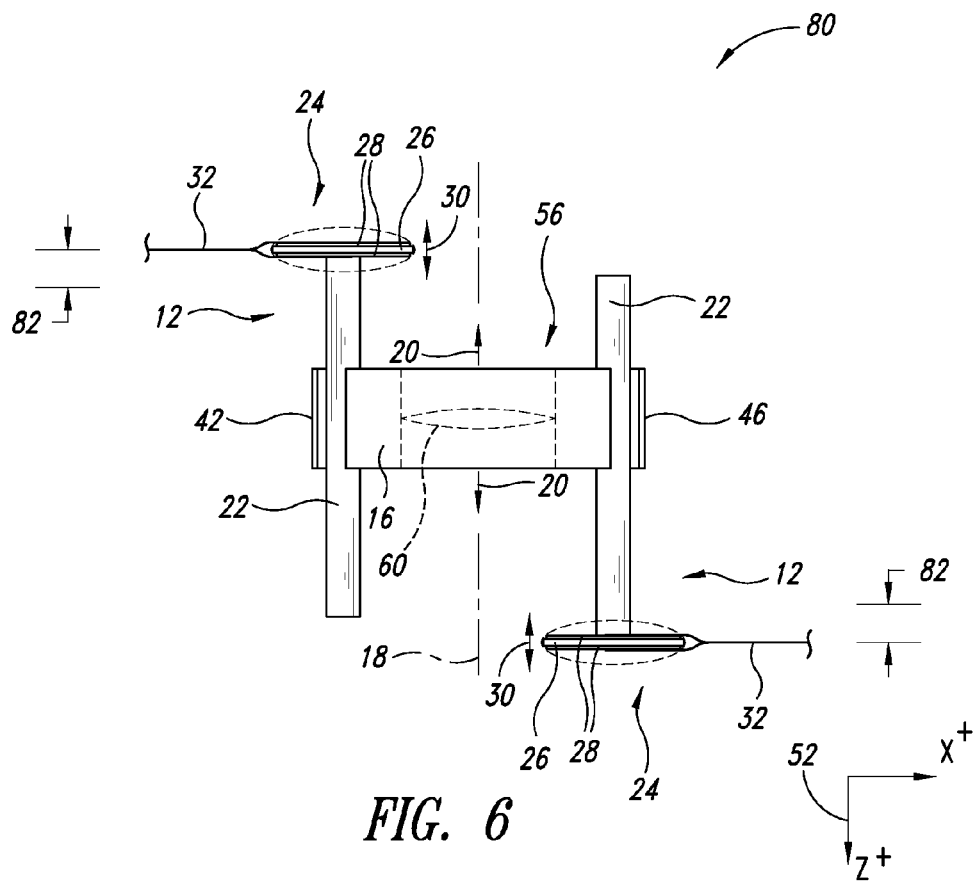
FIG. 6 is a top plan view of the linear actuator assembly of FIG. 5.

FIGS. 5 and 6 show a linear actuator assembly 80 according to yet another embodiment. In this embodiment, a second dynamic linear actuator 12 is coupled to the carriage 16 similar to the previously described embodiment, but in a direction opposite that of the first linear actuator 12. In this manner, the linear actuators 12 may operate in unison to cooperatively drive the carriage 16 back and forth along the travel axis 18, including in regions 82 proximate the bases 24 in which an individual linear actuator might not otherwise function to an acceptable performance level. For example, some linear actuators do not have a perfectly linear power response, and as such, near the base of the linear actuator performance tends to be more sluggish and hence generally unusable for quick, accurate positioning applications. This creates an unusable or "dead zone" in the region near the base containing the piezoelectric components. Mounting a pair of linear actuators 12 in opposing directions, however, enables one of the linear actuators to compensate for the inadequacy of the other in these dead zone regions 82. Consequently, the linear actuators 12 of the present embodiment can advantageously operate in unison to provide a more linear power response over a greater usable range.

Figure 7:
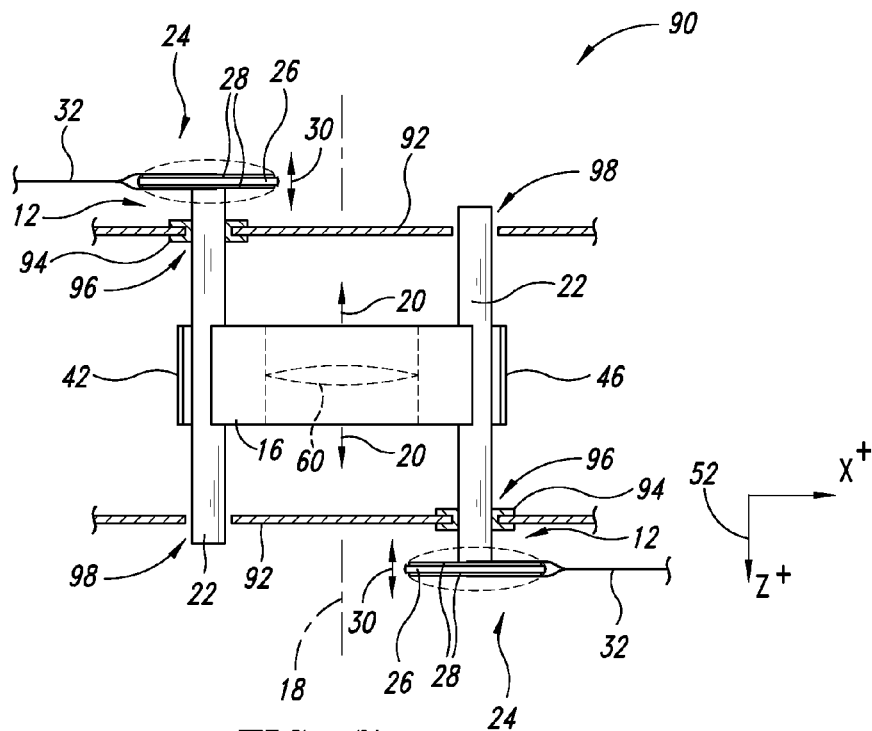
FIG. 7 is a top plan view of a linear actuator assembly according to yet another embodiment.

FIG. 7 shows a linear actuator assembly 90 according to yet another embodiment. In this embodiment, two opposing linear actuators 12 are coupled to a chassis 92 via elastomeric annular bushings 94. One bushing 94 is provided proximate the base 24 of each linear actuator 12 and received in a respective aperture 96 of the chassis 92. The bushings 94 enable the linear actuators 12 to be held in space while freely transferring the oscillations of the piezoelectric components 28 of the linear actuators 12 to the rods 22, which ultimately move the carriage 16 disposed therebetween. The bushings 94 prevent sliding of the rods 22 of the linear actuators 12 relative to the chassis 92.

As shown in the illustrated embodiment of FIG. 7, free ends of the linear actuators 12 may protrude through opposing apertures 98 in the chassis 92 to retain the linear actuators 12 substantially parallel to the travel axis 18. Clearance is provided between the apertures 98 and the rods 22 of the linear actuators 12 so as to not hinder the controlled movement of the rods 22. Springs 42, 46 are similarly provided to urge the linear actuators 12 into direct and continuous contact with the carriage 16 throughout operation.

Figure 8A:
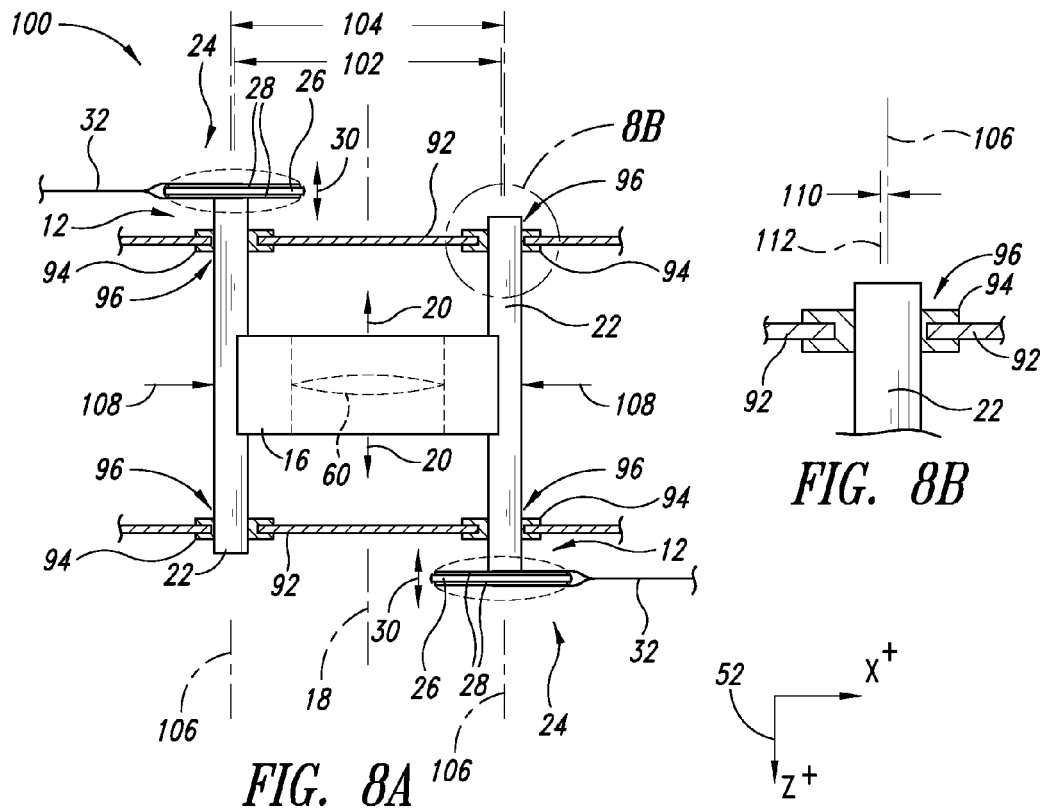
FIG. 8A is a top plan view of a linear actuator assembly according to still yet another embodiment.
Figure 8B:
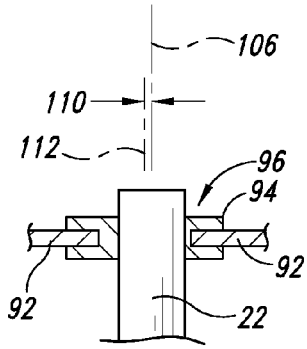
FIG. 8B is a partial detail view of the linear actuator assembly of FIG. 8A.

FIGS. 8A and 8B show a linear actuator assembly 100 according to still yet another embodiment. In this embodiment, springs for retaining the linear actuators 12 to the carriage 16 may be advantageously eliminated by providing elastomeric annular bushings 94 at each end of the rods 22 of the linear actuators 12 in respective apertures 96 of the chassis 92, and by designing the center-to-center distance 102 of the apertures 96 to be less than the distance 104 between centerlines 106 of the rods 22 of the linear actuators 12 when received in the notches 40, 44 of the carriage 16. In this manner, the bushings 94 are compressed from an unloaded configuration in which a central axis of each bushing 94 is aligned with the center of a respective aperture 96 receiving the bushing 94 to a loaded configuration in which the central axis of the bushing 94 is displaced from the center of the respective aperture 96. As a consequence, a resultant force 108 is applied to the rods 22 of the linear actuators 12, which urges the rods 22 into contact with the carriage 16 at the respective notches 40, 44 without the presence of a separate spring element. Consequently, the present embodiment provides a linear actuator assembly 100 in a relatively simple and cost efficient form factor. In some embodiments, an offset 110 between the centerline 112 of each mounting aperture 96 and the centerline 106 of the respective rod 22 passing therethrough is equal to or greater than 0.02 inches.

With reference now to FIGS. 1 through 8B, a method of making a linear actuator assembly 10, 70, 80, 90, 100 may include disposing a movable carriage 16 between a linear actuator 12 and an elongated cylindrical guide in the form of a static guide rod 14 or the dynamic rod 22 of another linear actuator 12. The method may further include coupling a spring 42 to the carriage 16 to urge the linear actuator 12 into contact with the carriage 16. Similarly, a second spring 46 may be coupled to the carriage 16 to urge the guide into contact with the carriage 16. In some embodiments, the method may further include coupling each of a pair of linear actuators 12 to a chassis 92 with one or more elastomeric bushings 94.

In some embodiments, the method of making a linear actuator assembly 10, 70, 80, 90, 100 may include disposing the movable carriage 16 between a pair of parallel aligned linear actuators 12 and coupling each of the linear actuators 12 to the chassis 92 with a pair of bushings 94. The bushings 94 may be asymmetrically compressed when the linear actuators 12 are received in the notches 40, 44 such that the rods 22 of the linear actuators 12 are urged into direct and continuous contact with the carriage 16 without the necessity of separate spring elements. Modifications and variations of the methods of making and assembling the linear actuator assemblies 10, 70, 80, 90, 100 described herein will be apparent to those skilled in the art in reviewing the present disclosure and accompanying figures.

Further, although embodiments of the linear actuator assemblies 10, 70, 80, 90, 100 disclosed herein have been described in connection with positioning a lens or lenses for autofocus purposes, it will be apparent to those skilled in the art that these assemblies and aspects of the same may be applied to a wide range of applications in which it is beneficial to translate a component in a particularly precise and efficient manner and in a particularly small form factor. Further, although aspects of the embodiments of the linear actuator assemblies and methods disclosed herein may be applicable to larger positioning devices, the linear actuator assemblies 10, 70, 80, 90, 100 described herein are particularly small devices which may fit, for example, within the confines of a reference cube having edges with a length equal to three-quarters of an inch or smaller.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A linear actuator assembly comprising:
a first linear actuator, the first linear actuator including a rod extending from a base, the base including a piezoelectric component to selectively oscillate the rod;
an elongated cylindrical guide spaced in parallel alignment with the rod of the first linear actuator;
a movable carriage, the carriage including a first notch to receive the rod of the first linear actuator and a second notch to receive the guide, and the carriage in direct and continuous contact with the first linear actuator and the guide at the first notch and the second notch, respectively, when the carriage moves linearly back and forth along a travel axis;
a first spring coupled to the carriage to urge the first linear actuator into contact with the first notch of the carriage; and
a second spring coupled to the carriage to urge the guide into contact with the second notch of the carriage, and
wherein the first spring and the second spring are flat cantilever springs coupled to the carriage remote from the first notch and the second notch, respectively.

2. A linear actuator assembly comprising:
a first linear actuator, the first linear actuator including a rod extending from a base, the base including a piezoelectric component to selectively oscillate the rod;
an elongated cylindrical guide spaced in parallel alignment with the rod of the first linear actuator;
a movable carriage, the carriage including a first notch to receive the rod of the first linear actuator and a second notch to receive the guide, and the carriage in direct and continuous contact with the first linear actuator and the guide at the first notch and the second notch, respectively, when the carriage moves linearly back and forth along a travel axis;
a first spring coupled to the carriage to urge the first linear actuator into contact with the first notch of the carriage; and
a second spring coupled to the carriage to urge the guide into contact with the second notch of the carriage, and
wherein the first spring urges the first linear actuator into contact with the first notch with more force than the second spring urges the guide into contact with the second notch.

3. The linear actuator assembly of claim 2 wherein the first spring and the second spring are identical and a diameter of the guide is smaller than a diameter of the rod of the first linear actuator.

4. The linear actuator assembly of claim 2 wherein the first spring has a greater spring constant than a spring constant of the second spring and a diameter of the guide is equal to a diameter of the rod of the first linear actuator.

5. The linear actuator assembly of claim 2 wherein each of the first notch and the second notch is V-shape.

6. A linear actuator assembly comprising:
a first linear actuator, the first linear actuator including a rod extending from a base, the base including a piezoelectric component to selectively oscillate the rod;
an elongated cylindrical guide spaced in parallel alignment with the rod of the first linear actuator, the guide being a rod extending from a base of a second linear actuator, the base of the second linear actuator including a piezoelectric component to selectively oscillate the rod of the second linear actuator; and
a movable carriage, the carriage including a first notch to receive the rod of the first linear actuator and a second notch to receive the guide, and the carriage in direct and continuous contact with the first linear actuator and the guide at the first notch and the second notch, respectively, when the carriage moves linearly back and forth along a travel axis.

7. The linear actuator assembly of claim 6 wherein the second linear actuator is oriented in a same direction as the first linear actuator to selectively cooperatively move the carriage back and forth along the travel axis.

8. The linear actuator assembly of claim 6 wherein the second linear actuator is oriented in an opposite direction of the first linear actuator to selectively cooperatively move the carriage back and forth along the travel axis.

9. The linear actuator assembly of claim 6 wherein the first linear actuator and the second linear actuator are ultrasonic linear actuators.

10. The linear actuator assembly of claim 6, further comprising:
a chassis; and
a plurality of elastomeric bushings, at least one of the plurality of elastomeric bushings coupled to the chassis to receive a portion of the first linear actuator, and at least one of the plurality of elastomeric bushings coupled to the chassis to receive a portion of the second linear actuator.

11. The linear actuator assembly of claim 10 wherein a first pair of elastomeric bushings is coupled to the chassis to support the first linear actuator at opposing ends thereof and a second pair of elastic elastomeric bushings are coupled to the chassis to support the second linear actuator at opposing ends thereof.

12. The linear actuator assembly of claim 11 wherein a nominal distance between apertures of the chassis to receive the first pair of elastomeric bushings and apertures of the chassis to receive the second pair of elastomeric bushings is less than a distance between a centerline of the rod of the first linear actuator and a centerline of the rod of the second linear actuator when received in the first notch and the second notch of the carriage, respectively.

13. The linear actuator assembly of claim 6, further comprising:
a lens coupled to the carriage to move back and forth therewith.

14. A linear actuator assembly comprising:
a first linear actuator, the first linear actuator including a rod extending from a base, the base including a piezoelectric component to selectively oscillate the rod;
an elongated cylindrical guide spaced in parallel alignment with the rod of the first linear actuator; and
a movable carriage, the carriage including a first notch to receive the rod of the first linear actuator and a second notch to receive the guide, and the carriage in direct and continuous contact with the first linear actuator and the guide at the first notch and the second notch, respectively, when the carriage moves linearly back and forth along a travel axis; and
wherein the linear actuator assembly is sized to lie within the confines of a reference cube having edges with a length equal to three-quarters of an inch.

15. An autofocus imager, comprising:
a linear actuator assembly, the linear actuator assembly including a movable carriage and a pair of linear actuators to cooperatively move the carriage back and forth along a travel axis, the carriage including a pair of corresponding notches to receive a rod of a respective one of the pair of linear actuators, and each rod of the pair of linear actuators urged into direct and continuous contact with the carriage as the carriage moves back and forth along the travel axis; and
a lens coupled to the carriage to move back and forth therewith to adjust a focus of the autofocus imager.

16. The autofocus imager of claim 15 wherein the pair of linear actuators are oriented in a same direction.

17. The autofocus imager of claim 15 wherein the pair of linear actuators are oriented in opposite directions.

18. The autofocus imager of claim 15 wherein the pair of linear actuators are ultrasonic linear actuators.

19. The autofocus imager of claim 15 wherein the linear actuator assembly includes a chassis and a plurality of elastomeric bushings, at least one elastomeric bushing coupled to the chassis to receive a portion of a first one of the pair of linear actuators and at least one elastomeric bushing coupled to the chassis to receive a portion of a second one of the pair of linear actuators.

20. The autofocus imager of claim 19 wherein a nominal distance between an aperture in the chassis to receive the elastomeric bushing corresponding to the first one of the pair of linear actuators and an aperture in the chassis to receive the elastomeric bushing corresponding to the second one of the pair of linear actuators is less than a distance between a centerline of a rod of the first one of the pair of linear actuators and a centerline of a rod of the second one of the pair of linear actuators when the pair of linear actuators are received in the corresponding pair of notches.

21. A method of making a linear actuator assembly, the method comprising:
providing a first linear actuator including a rod extending from a base, the base of the first linear actuator including a piezoelectric component to selectively oscillate the rod of the first linear actuator;
providing a second linear actuator including a rod extending from a base, the base of the second linear actuator including a piezoelectric component to selectively oscillate the rod of the second linear actuator; and
disposing a movable carriage between the first linear actuator and the second linear actuator with the rod of the second linear actuator spaced in parallel alignment with the rod of the first linear actuator, the rod of the first linear actuator and the rod of the second linear actuator positioned in a respective notch of the carriage such that the carriage is supported in direct and continuous contact with the rod of the first linear actuator and the rod of the second linear actuator when the carriage moves back and forth along a travel axis.

22. The method of claim 21, further comprising:
coupling a first spring to the carriage to bias the rod of the first linear actuator into contact with the carriage; and
coupling a second spring to the carriage to bias the rod of the second linear actuator into contact with the carriage.

23. The method of claim 21, further comprising:
coupling the first linear actuator to a chassis with at least one elastomeric bushing; and
coupling the second linear actuator to the chassis with at least one elastomeric bushing.

24. The method of claim 23 wherein coupling the first linear actuator and the second linear actuator to the chassis includes coupling the first linear actuator and the second linear actuator to the chassis such that a nominal distance between an aperture in the chassis to receive an elastomeric bushing corresponding to the first linear actuator and an aperture in the chassis to receive an elastomeric bushing corresponding to the second linear actuator is less than a distance between a centerline of the rod of the first linear actuator and a centerline of the rod of the second linear actuator when the linear actuators are received in the notches of the carriage.

\* \* \* \* \*